US012013599B2

(12) United States Patent
Liu et al.

(10) Patent No.: US 12,013,599 B2
(45) Date of Patent: Jun. 18, 2024

(54) DIFFRACTIVE DEEP NEURAL NETWORK (D2NN) PROCESSING USING A SINGLE MODULATION LAYER

(71) Applicant: Huawei Technologies Co., Ltd., Shenzhen (CN)

(72) Inventors: Xiang Liu, Plano, TX (US); Yongxi Tan, Plano, TX (US); Ning Cheng, Plano, TX (US); Jin Yang, Plano, TX (US); Frank Effenberger, Glen Mills, PA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 17/587,956

(22) Filed: Jan. 28, 2022

(65) Prior Publication Data

US 2022/0155618 A1 May 19, 2022

Related U.S. Application Data

(63) Continuation of application No. PCT/US2019/062637, filed on Nov. 21, 2019.

(51) Int. Cl.
*G02F 1/01* (2006.01)
*G02B 27/42* (2006.01)

(52) U.S. Cl.
CPC ....... *G02F 1/0102* (2013.01); *G02B 27/4277* (2013.01)

(58) Field of Classification Search
CPC .......................... G02F 1/0102; G02B 27/4277
(Continued)

(56) References Cited

U.S. PATENT DOCUMENTS 4,959,532 A 9/1990 Owechko
11,694,071 B2 * 7/2023 Lee .......................... G06N 3/08
359/279

(Continued)

FOREIGN PATENT DOCUMENTS

CN 108431669 A 8/2018
CN 109073889 A 12/2018
(Continued)

OTHER PUBLICATIONS

Lin, et al., "All-Optical Machine Learning Using Diffractive Deep Neural Networks," Science, 10.1126/science.aat8084, (2018), downloaded from the internet: http://science.sciencemag.org/ Jul. 26, 2018, 52 pages.

(Continued)

*Primary Examiner* — William Choi
(74) *Attorney, Agent, or Firm* — Conley Rose, P.C.

(57) ABSTRACT

An apparatus comprises a first mirror; a second mirror; a modulation layer positioned between the first mirror and the second mirror and comprising a plurality of modulation regions; a diffraction layer positioned between the modulation layer and the second mirror, and an input port admitting a light beam into the apparatus. The light beam passes through the diffraction layer and is modulated by the modulation layer to create a first modulated beam before being reflected by the first mirror, the first mirror reflecting the first modulated beam toward the second mirror, the second mirror reflecting the first modulated beam toward the modulation layer to be modulated for at least a second time.

20 Claims, 13 Drawing Sheets

(58) Field of Classification Search
USPC .......................................................... 359/260
See application file for complete search history.

(56) References Cited

U.S. PATENT DOCUMENTS

| | | |
|---|---|---|
| 2017/0199496 A1 | 7/2017 | Grata et al. |
| 2019/0041634 A1 | 2/2019 | Popovich et al. |
| 2019/0361358 A1 | 11/2019 | Tel et al. |
| 2020/0326529 A1 † | 10/2020 | Jacquard |
| 2020/0333532 A1 † | 10/2020 | Labroille |
| 2020/0409141 A1 † | 12/2020 | Pinel |

FOREIGN PATENT DOCUMENTS

| | | |
|---|---|---|
| CN | 110383177 A | 10/2019 |
| CN | 110430415 A | 11/2019 |
| EP | 0499469 A2 | 8/1992 |
| GB | 2332545 A | 6/1999 |
| WO | 2019129518 A1 | 7/2019 |
| WO | 2019129954 A1 | 7/2019 |
| WO | 2019200289 A1 | 10/2019 |

OTHER PUBLICATIONS

Guillaume Labroille, et al.; Efficient and mode selective spatial mode multiplexer based on multi-plane light conversion; 9 pages; Jun. 18, 2014; Optics Express.†

\* cited by examiner
† cited by third party

DIFFRACTIVE DEEP NEURAL NETWORK (D2NN) PROCESSING USING A SINGLE MODULATION LAYER

CROSS-REFERENCE TO RELATED APPLICATIONS

This is a continuation of Int'l Patent App. No. PCT/US2019/062637 filed on Nov. 21, 2019, which is incorporated by reference.

TECHNICAL FIELD

The disclosed embodiments relate to $D^2NN$s in general and $D^2NN$ processing using a single modulation layer in particular.

BACKGROUND

Machine learning implements algorithms to build a mathematical model using training data. The mathematical model then makes predictions using input data. Deep learning is a type of machine learning that uses layers to progressively extract higher-level features from the input data. Deep learning can use different types of architectures. One such architecture is a deep neural network (DNN). DNNs determine the correct mathematical manipulation at each layer in order to turn the input data into output data based on probabilities of various outputs at each layer. Deep learning has applications in image analysis, speech recognition, language translation, and other disciplines.

SUMMARY

A first aspect relates to an apparatus comprising a first mirror; a second mirror; a modulation layer positioned between the first mirror and the second mirror and comprising a plurality of modulation regions; a diffraction layer positioned between the modulation layer and the second mirror; and an input port admitting a light beam into the apparatus, the light beam passing through the diffraction layer and being modulated by the modulation layer to create a first modulated beam before being reflected by the first mirror, the first mirror reflecting the first modulated beam toward the second mirror, the second mirror reflecting the first modulated beam toward the modulation layer to be modulated for at least a second time.

In a first implementation form of the apparatus according to the first aspect as such the modulation layer is coupled to the first mirror.

In a second implementation form of the apparatus according to the first aspect as such or any preceding implementation form of the first aspect, the modulation layer comprises a phase mask.

In a third implementation form of the apparatus according to the first aspect as such or any preceding implementation form of the first aspect, the modulation layer comprises an SLM.

In a fourth implementation form of the apparatus according to the first aspect as such or any preceding implementation form of the first aspect, the apparatus further comprises a non-linearity layer positioned between the diffraction layer and the second mirror and coupled to the second mirror.

In a fifth implementation form of the apparatus according to the first aspect as such or any preceding implementation form of the first aspect, the apparatus further comprises Fresnel lenses positioned between the diffraction layer and the second mirror and coupled to the second mirror.

In a sixth implementation form of the apparatus according to the first aspect as such or any preceding implementation form of the first aspect, the Fresnel lenses have a focal length F that is equal to about twice an effective light beam path length between the second mirror and the first mirror.

In a seventh implementation form of the apparatus according to the first aspect as such or any preceding implementation form of the first aspect, the second mirror is a concave mirror.

In an eighth implementation form of the apparatus according to the first aspect as such or any preceding implementation form of the first aspect, the second mirror has a focal length F that is equal to about an effective light beam path length between the second mirror and the first mirror.

In a ninth implementation form of the apparatus according to the first aspect as such or any preceding implementation form of the first aspect, the apparatus further comprises an anti-reflection (AR) layer positioned between adjacent layers, wherein the AR layer and the adjacent layers have different refractive indices.

In a tenth implementation form of the apparatus according to the first aspect as such or any preceding implementation form of the first aspect, the diffraction layer comprises air.

In an eleventh implementation form of the apparatus according to the first aspect as such or any preceding implementation form of the first aspect, the diffraction layer comprises glass.

In a twelfth implementation form of the apparatus according to the first aspect as such or any preceding implementation form of the first aspect, the first mirror and the second mirror are substantially parallel.

In a thirteenth implementation form of the apparatus according to the first aspect as such or any preceding implementation form of the first aspect, the apparatus is a $D^2NN$.

In a fourteenth implementation form of the apparatus according to the first aspect as such or any preceding implementation form of the first aspect, the $D^2NN$ further comprises an output port spaced apart from the input port, wherein the $D^2NN$ is part of a $D^2NN$ system comprising a PD array coupled to the output port.

A second aspect relates to a $D^2NN$ device comprising an input port configured to receive a light beam; a modulation layer comprising a first modulation region and a second modulation region, the first modulation region configured to perform a first spatial modulation on the light beam to obtain a first modulation signal; a first mirror configured to reflect the first modulated signal at a first non-zero incident angle to obtain a first reflected signal; a diffraction layer configured to diffract the first reflected signal to obtain a diffracted signal; and a second mirror configured to reflect the diffracted signal at a second non-zero incident angle to obtain a second reflected signal, the second modulation region configured to perform a second spatial modulation on the second reflected signal to obtain a second modulated signal.

In a first implementation form of the $D^2NN$ device according to the second aspect as such, the $D^2NN$ device further comprises a lens configured to focus the diffracted signal before the second mirror reflects the diffracted signal.

In a second implementation form of the $D^2NN$ device according to the second aspect as such or any preceding implementation form of the second aspect, the lens is a Fresnel lens.

In a third implementation form of the $D^2NN$ device according to the second aspect as such or any preceding implementation form of the second aspect, the Fresnel lens has a focal length F that is equal to about twice an effective light beam path length between the second mirror and the first mirror.

In a fourth implementation form of the $D^2NN$ device according to the second aspect as such or any preceding implementation form of the second aspect, the modulation layer comprises at least one additional modulation region configured to perform an additional spatial modulation to obtain a final modulated signal, and wherein the $D^2NN$ device further comprises an output port configured to pass the final modulated signal towards a PD array.

In a fifth implementation form of the $D^2NN$ device according to the second aspect as such or any preceding implementation form of the second aspect, the first non-zero incident angle and the second non-zero incident angle are different.

In a sixth implementation form of the $D^2NN$ device according to the second aspect as such or any preceding implementation form of the second aspect, the first non-zero incident angle and the second non-zero incident angle are the same.

In a seventh implementation form of the $D^2NN$ device according to the second aspect as such or any preceding implementation form of the second aspect, the second mirror is concave.

In an eighth implementation form of the $D^2NN$ device according to the second aspect as such or any preceding implementation form of the second aspect, the second mirror is configured to focus the diffracted signal back towards the first mirror.

In a ninth implementation form of the $D^2NN$ device according to the second aspect as such or any preceding implementation form of the second aspect, the second mirror has a focal length F that is equal to about an effective light beam path length between the second mirror and the first mirror.

In a tenth implementation form of the $D^2NN$ device according to the second aspect as such or any preceding implementation form of the second aspect, the first spatial modulation and the second spatial modulation are any combination of a phase modulation or an amplitude modulation.

In an eleventh implementation form of the $D^2NN$ device according to the second aspect as such or any preceding implementation form of the second aspect, the first spatial modulation and the second spatial modulation are static.

In a twelfth implementation form of the $D^2NN$ device according to the second aspect as such or any preceding implementation form of the second aspect, the first spatial modulation and the second spatial modulation are dynamic and based on modulation signals from programmable modulator drivers.

In a thirteenth implementation form of the $D^2NN$ device according to the second aspect as such or any preceding implementation form of the second aspect, the $D^2NN$ device further comprises a non-linearity layer configured to generate a non-linearity in the diffracted signal based on an electro-optical effect before the second mirror reflects the diffracted signal.

In a fourteenth implementation form of the $D^2NN$ device according to the second aspect as such or any preceding implementation form of the second aspect, the $D^2NN$ device further comprises a non-linearity layer configured to generate a non-linearity in the diffracted signal based on an electro-absorption effect before the second mirror reflects the diffracted signal.

In a fifteenth implementation form of the $D^2NN$ device according to the second aspect as such or any preceding implementation form of the second aspect, the light beam comprises an optical image.

A third aspect relates to a method of $D^2NN$ processing, the method comprising receiving a light beam; performing, using a first modulation region of a modulation layer, a first spatial modulation of the light beam to obtain a first modulated signal; reflecting the first modulated signal at a first non-zero incident angle to obtain a first reflected signal; diffracting the first reflected signal to obtain a diffracted signal; reflecting the diffracted signal at a second non-zero incident angle to obtain a second reflected signal; and performing, using a second modulation region of the modulation layer, a second spatial modulation of the second reflected signal to obtain a second modulated signal.

In a first implementation form of the method according to the third aspect as such, the method further comprises focusing the diffracted signal before reflecting the diffracted signal.

In a second implementation form of the method according to the third aspect as such or any preceding implementation form of the third aspect, the method further comprises performing at least one additional spatial modulation to obtain a final modulated signal; and passing the final modulated signal towards a PD array.

In a third implementation form of the method according to the third aspect as such or any preceding implementation form of the third aspect, the first non-zero incident angle and the second non-zero incident angle are different.

In a fourth implementation form of the method according to the third aspect as such or any preceding implementation form of the third aspect, the first non-zero incident angle and the second non-zero incident angle are the same.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
AI: artificial intelligence
AR: anti-reflection
ASIC: application-specific integrated circuit
CPU: central processing unit
DNN: deep NN
D²NN: diffractive DNN
DSP: digital signal processor
EO: electrical-to-optical
FPGA: field-programmable gate array
FSO: free-space optics
mm: millimeter(s)
NN: neural network
OE: optical-to-electrical
PD: photodetector
RAM: random-access memory
RF: radio frequency
ROM: read-only memory
RX: receiver unit
SiO₂: silicon dioxide
SLM: spatial light modulator
SRAM: static RAM
TCAM: ternary content-addressable memory
TX: transmitter unit
2D: two-dimensional
3D: three-dimensional
°: degree(s)
%: percent.

Figure 1:
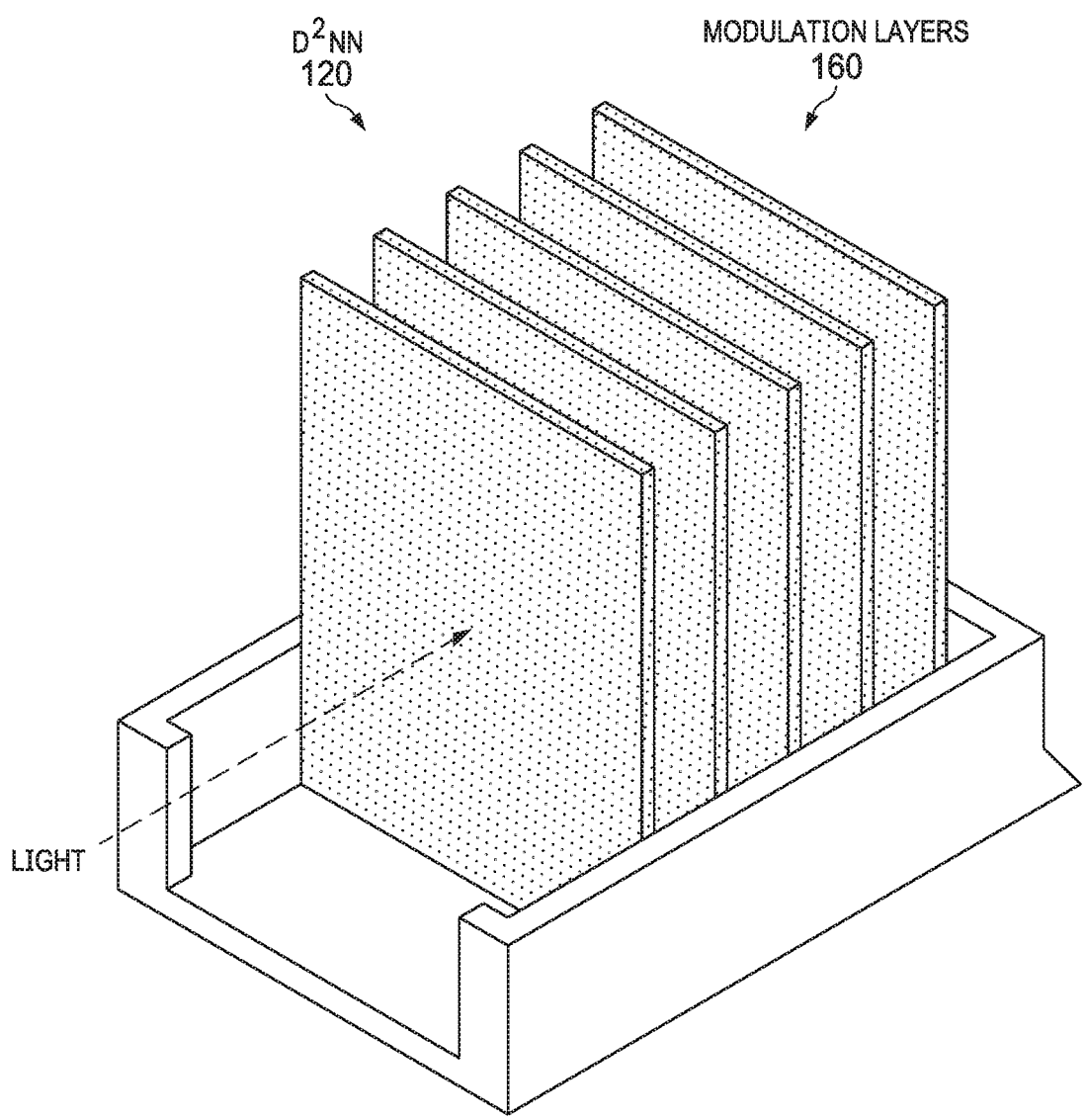
FIG. 1 is a cut-away diagram of an existing $D^2NN$.

FIG. 1 is a cut-away diagram of an existing D²NN 120. The D²NN 120 includes multiple modulation layers 160. A light beam 140 is directed substantially orthogonally to the modulation layers 160. Light that emerges from the modulation layers 160 after passing through the D²NN 120 impinges on a PD array (not shown), wherein the PD array quantifies the emergent light. The D²NN 120 is an all-optical component and comprises multiple modulation layers 160, such as five modulation layers 160 in the example shown. The modulation layers 160 are 2D and parallel to each other.

The light beam 140 impinges on the D²NN 120 orthogonally or nearly orthogonally. The light beam 140 subsequently passes through some or all of the modulation layers 160. An individual modulation layer 160 may include regions that affect and modulate the impinging light. As a result, the impinging light beam 140 may be affected by each modulation layer 160 of the D²NN 120.

Together, the modulation layers 160 perform an arbitrary function that a computer can learn. The PD array 110 converts the light beam 140 into an electrical signal for further processing by a computer or other device.

The D²NN 120 performs optical processing near the speed of light, requires little or no power consumption, and can perform complex functions. However, the typical D²NN 120 has disadvantages. First, the design of the D²NN 120 is relatively complex, as multiple 2D modulation layers 160 are needed. Together, the 2D modulation layers 160 form a 3D cube and can be physically large. Second, there is loss of optical power of the light beam 140 when the light beam 140 diverges to be larger than the area of the modulation layers 160. Third, it may be difficult to insert nonlinear materials into the D²NN 120 to introduce non-linearities, because the D²NN is an enclosed 3D cube. Fourth, each modulation layer 160 may need to be dynamically reconfigured by an array of modulator drivers, which would be located between the modulation layers 160 due to the design of the D²NN 120. The modulator drivers can interfere with light transmission between layers. Alternatively, it may be difficult or expensive to make the modulation drivers transparent in order to allow the light beam 140 to pass through.

Disclosed herein are embodiments for D²NN processing using a single modulation layer. Disclosed herein are embodiments for D²NN processing and modulating multiple times using a single modulation layer. The modulation layer in any of the embodiments herein comprises modulation regions that each spatially modulate a light beam after reflection of the light beam. The D²NN may further comprise one or more of a non-linearity layer, a concave mirror, and lenses. The D²NN may use static or dynamic modulation.

The embodiments provide several advantages. For instance, first, the design of the D²NN is relatively simple because only a single, 2D modulation layer is needed. Second, there is no intrinsic loss of optical power of the light beam within the D²NN. Third, it is relatively easy to programmably or reconfigurably modulate a light beam by placing modulator drivers outside the D²NN, so that they do not hinder propagation of the light beam inside the D²NN. Fourth, it is relatively easy to introduce non-linearities due to the structure of the D²NN. Specifically, the D²NN comprises a number of layers, so adding a non-linearity layer requires simply depositing another layer in a manufacturing process. Various embodiments are described, and those embodiments may be combined in any suitable manner.

Figure 2:
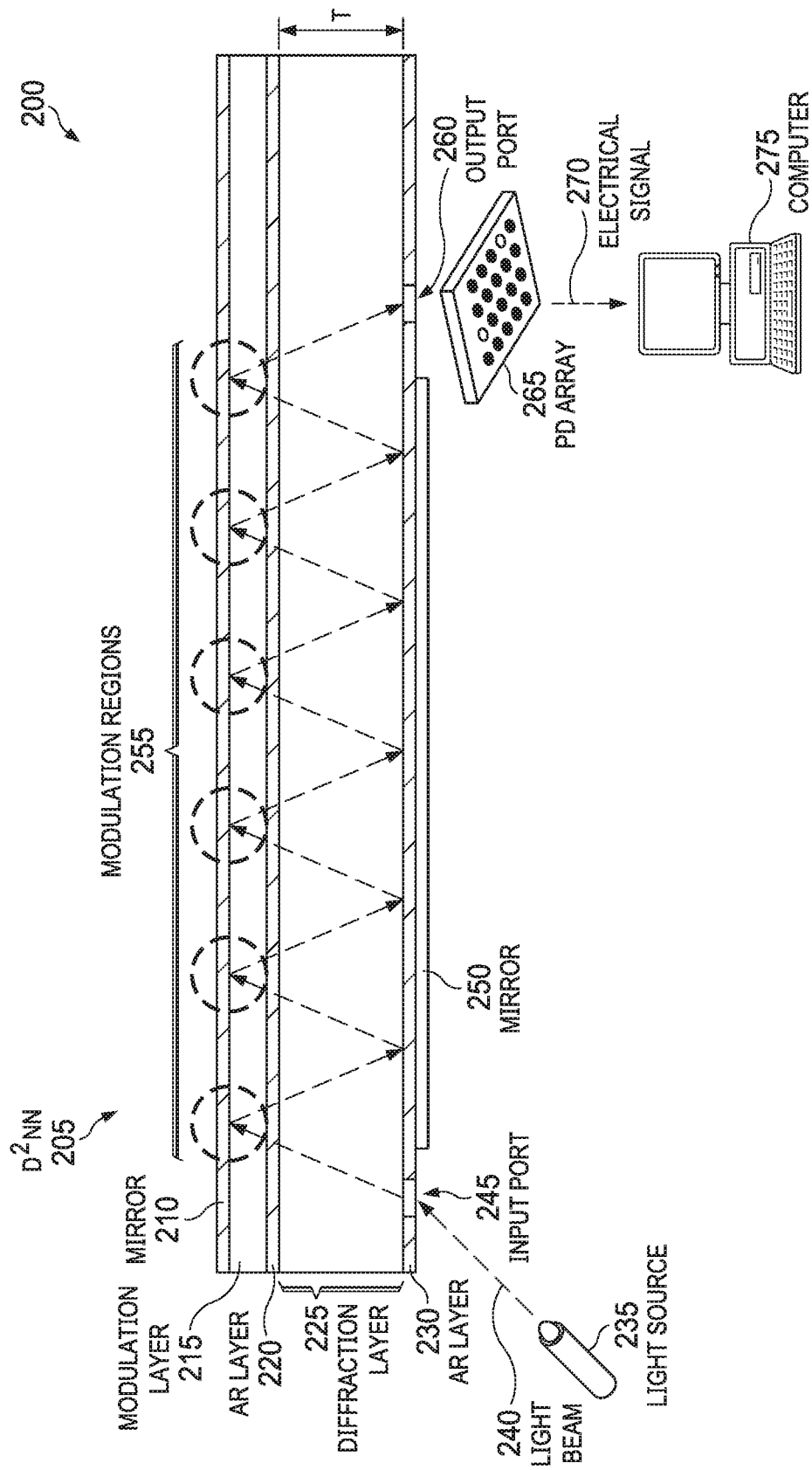
FIG. 2 is a schematic diagram of a $D^2NN$ system according to an embodiment of the disclosure.

FIG. 2 is a schematic diagram of a D²NN system 200 according to an embodiment of the disclosure. The D²NN system 200 comprises a D²NN 205, a light source 235 configured to emit a light beam 240, a PD array 265 configured to output an electrical signal 270, and a computer 275. The D²NN 205 comprises a mirror 210, a modulation layer 215, an AR layer 220, a diffraction layer 225, an AR layer 230, an input port 245, a mirror 250, and an output port 260. Light to be modulated is directed into the input port 245 and the modulated light is emitted at the output port 260. The modulation layer 215 comprises six modulation regions 255 in the embodiment shown. The components of the D²NN system 200 may be arranged as shown, or may be arranged in another suitable manner. For instance, though six modulation regions 255 are shown, the modulation layer 215 may have any suitable number of modulation regions. In addition, the modulation regions 255 are annotated with circles, but the circles do not indicate an actual size. Thus, the modulation regions 255 may be the same size or may be different sizes as discussed below.

The mirrors 210, 250 may comprise a dielectric material such as $SiO_2$. The modulation layer 215 may comprise a phase mask, which in turn comprises silicon with a suitable doping that causes a desired diffraction of light passing therethrough. The modulation layer 215 may be attached to the mirror 210. Similarly, another modulation layer may be attached to the mirror 250.

The AR layers 220, 230 may be dielectric coatings whose refractive indices are different from indices of reflection of adjacent layers. In the $D^2NN$ 205, the adjacent layers of the AR layer 220 are the modulation layer 215 and the diffraction layer 225, and the adjacent layers of the AR 230 are the diffraction layer 225 and the mirror 250. The diffraction layer 225 is transparent and may comprise air or glass, for example.

The light source 235 may be a laser and the light beam 240 may comprise a laser beam. The AR layer 230 is substantially transparent to the light beam 240, so the input port 245 is not a physical opening, but is instead a portion of the AR layer 230 that inputs the light beam 240 into the diffraction layer 225. The modulation regions 255 are spatially separated from each other. No component of the $D^2NN$ 205 may spatially interrupt the modulation regions 255 within the modulation layer 215. Like the input port 245, the output port 260 is not a physical opening, but is instead a portion of the AR layer 230 that outputs the light beam 240 towards the PD array 265.

The PD array 265 is suitable for receiving any light beam with a given spatial resolution. The computer 275 may implement an electrical NN using AI algorithms. The mirrors 210, 250; the modulation layer 215; the AR layers 220, 230; and the diffraction layer 225 are substantially parallel to each other in a horizontal direction.

In an example, the diffraction layer 225 has a refractive index n of about 1.46 and a thickness T of about 6.8 mm. The light beam 240 has an input diameter of about 0.8 mm and enters the input port 245 at an external angle of about 37.5°. The light beam 240 reflects within the $D^2NN$ 205 at a non-zero incident angle, for instance an internal angle of about 24°. Each time the light beam 240 does so, it increases in diameter by about 0.8 mm. Thus, the light beam 240 exits the output port 260 with an output diameter of about 4.8 mm and the external angle of about 37.5°. The $D^2NN$ 205 provides a diffraction angle of about 2°.

In operation, the light source 235 emits the light beam 240, and the light beam 240 enters the $D^2NN$ 205 through the input port 245. The light beam 240 travels through the AR layer 230, the diffraction layer 225, and the AR layer 220. At a first modulation region 255, the light beam 240 is optically modulated. Specifically, the light beam is spatially modulated with a given spatial resolution, and the spatial modulation is phase modulation, amplitude modulation, or both phase modulation and amplitude modulation. The spatial modulation may be static, meaning it is set during manufacture of the $D^2NN$ 205. After this modulation, the light beam 240 reflects off of the mirror 210; again is spatially modulated at the first modulation region 255; and travels back through the AR layer 220, the diffraction layer 225, and the AR layer 230. Next, the light beam 240 reflects off of the mirror 250 and repeats the process above for the remaining modulation regions 255. Each modulation region 255 implements a form of processing. Together, the modulation regions 255 perform a desired NN function. Unlike the $D^2NN$ 120 in FIG. 1, in which the light beam 140 passes in a substantially straight direction through multiple modulation layers to be modulated, in the $D^2NN$ 205 according to an embodiment, the light beam 240 reflects to multiple modulation regions 255 of the same modulation layer 215 to be modulated.

After spatial modulation, the light beam 240 exits the output port 260 and enters the PD array 265. The PD array 265 converts the light beam 240 into the electrical signal 270 and passes the electrical signal 270 to the computer 275. Finally, the computer 275 performs additional processing to complete a given $D^2NN$ task.

When the $D^2NN$ system 200 is to process an optical image, the $D^2NN$ system 200 may do so in different manners. In one embodiment, an optoelectronic system obtains the optical image, converts the optical image into an electrical image, and drives the light source 235 based on the electrical image to produce the light beam 240. In another embodiment, the light source 235 transmits the optical image directly to the $D^2NN$ 205. Specifically, the light beam 240 comprises the optical image. In that case, optical-to-electrical processing is not needed.

The $D^2NN$ 205 has several advantages. First, the design of the $D^2NN$ 205 is relatively simple because only a single, 2D modulation layer, the modulation layer 215, is needed. Second, there is no intrinsic loss of optical power of the light beam 240 within the $D^2NN$ 205. Third, the $D^2NN$ 205 may not require any power consumption because the modulation layer 215 may be passive. Fourth, the $D^2NN$ 205 may be made without any moving parts. Fifth, manufacture of the $D^2NN$ 205 may use a standard, relatively low-cost process. Sixth, alignment of the $D^2NN$ 205 with the light source 235 and the PD array 265 may be done relatively easily by maximizing a power of the light beam 240 at the output.

Figure 3:
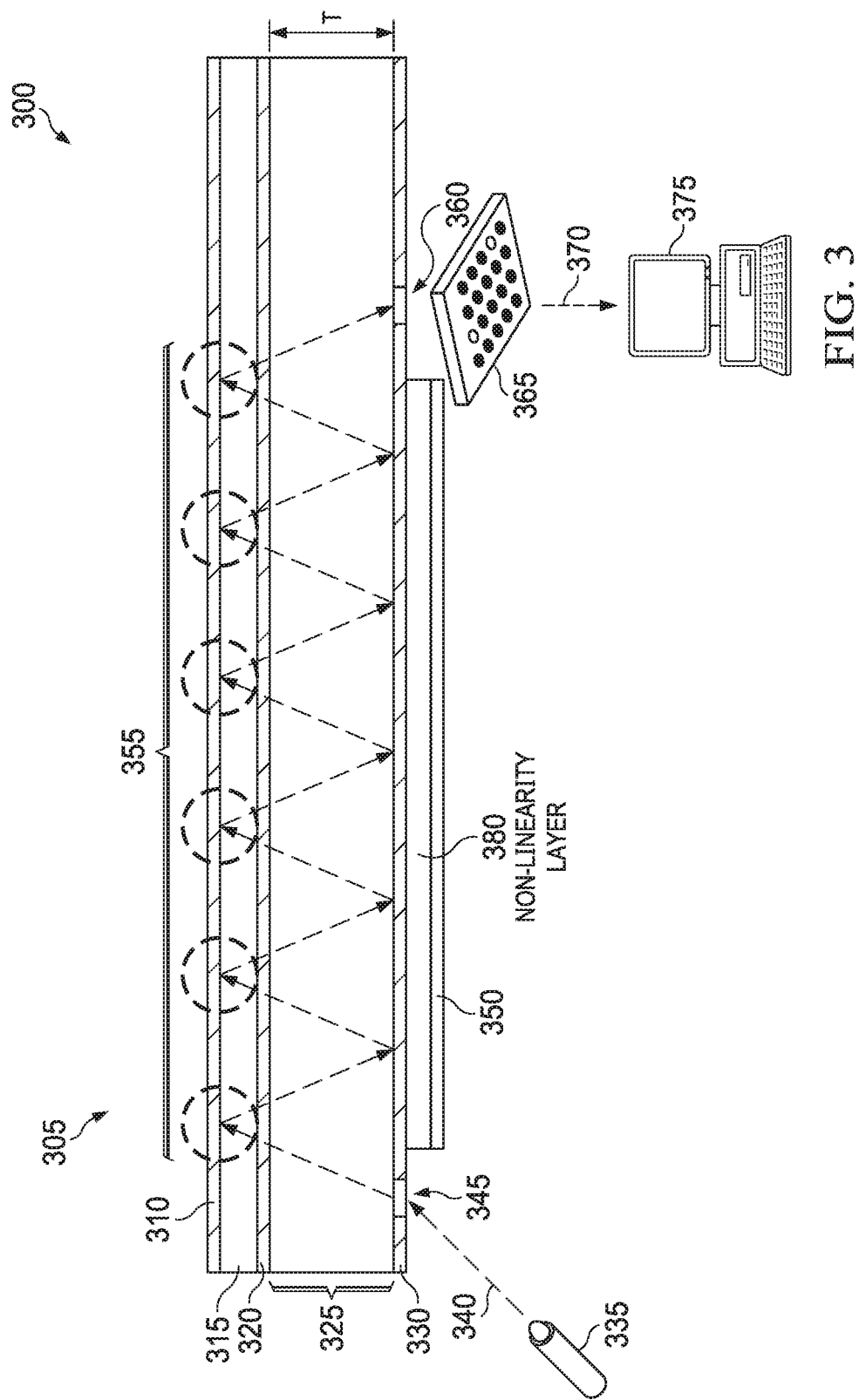
FIG. 3 is a schematic diagram of a $D^2NN$ system according to another embodiment of the disclosure.

FIG. 3 is a schematic diagram of a $D^2NN$ system 300 according to another embodiment of the disclosure. The $D^2NN$ system 300 is similar to the $D^2NN$ system 200 in FIG. 2. Specifically, the $D^2NN$ system 300 comprises a $D^2NN$ 305, a light source 335 configured to emit a light beam 340, a PD array 365 configured to output an electrical signal 370, and a computer 375 similar to the $D^2NN$ 205, the light source 235, the light beam 240, the PD array 265, the electrical signal 270, and the computer 275, respectively, in the $D^2NN$ system 200. In addition, the $D^2NN$ 305 comprises a mirror 310, a modulation layer 315, an AR layer 320, a diffraction layer 325, an AR layer 330, an input port 345, a mirror 350, and an output port 360 similar to the mirror 210, the modulation layer 215, the AR layer 220, the diffraction layer 225, the AR layer 230, the input port 245, the mirror 250, and the output port 260, respectively, in the $D^2NN$ 205. Finally, the modulation layer 315 comprises six modulation regions 355 similar to the modulation regions 255 in the modulation layer 215.

However, unlike the $D^2NN$ 205, the $D^2NN$ 305 further comprises a non-linearity layer 380. The non-linearity layer 380 comprises silicon layers with quantum wells or comprises another suitable material. The non-linearity layer 380 generates non-linearities based on an electro-optical effect, an electro-absorption effect, or another effect. Non-linearities may supplement linearities to better identify the light beam 340.

The $D^2NN$ 305 has the advantages described above for the $D^2NN$ 205. In addition, it is relatively easy to introduce non-linearities due to the structure of the $D^2NN$ 305. Specifically, the $D^2NN$ 305 comprises a number of layers, so adding the non-linearity layer 380 requires simply depositing another layer in a manufacturing process.

Figure 4:
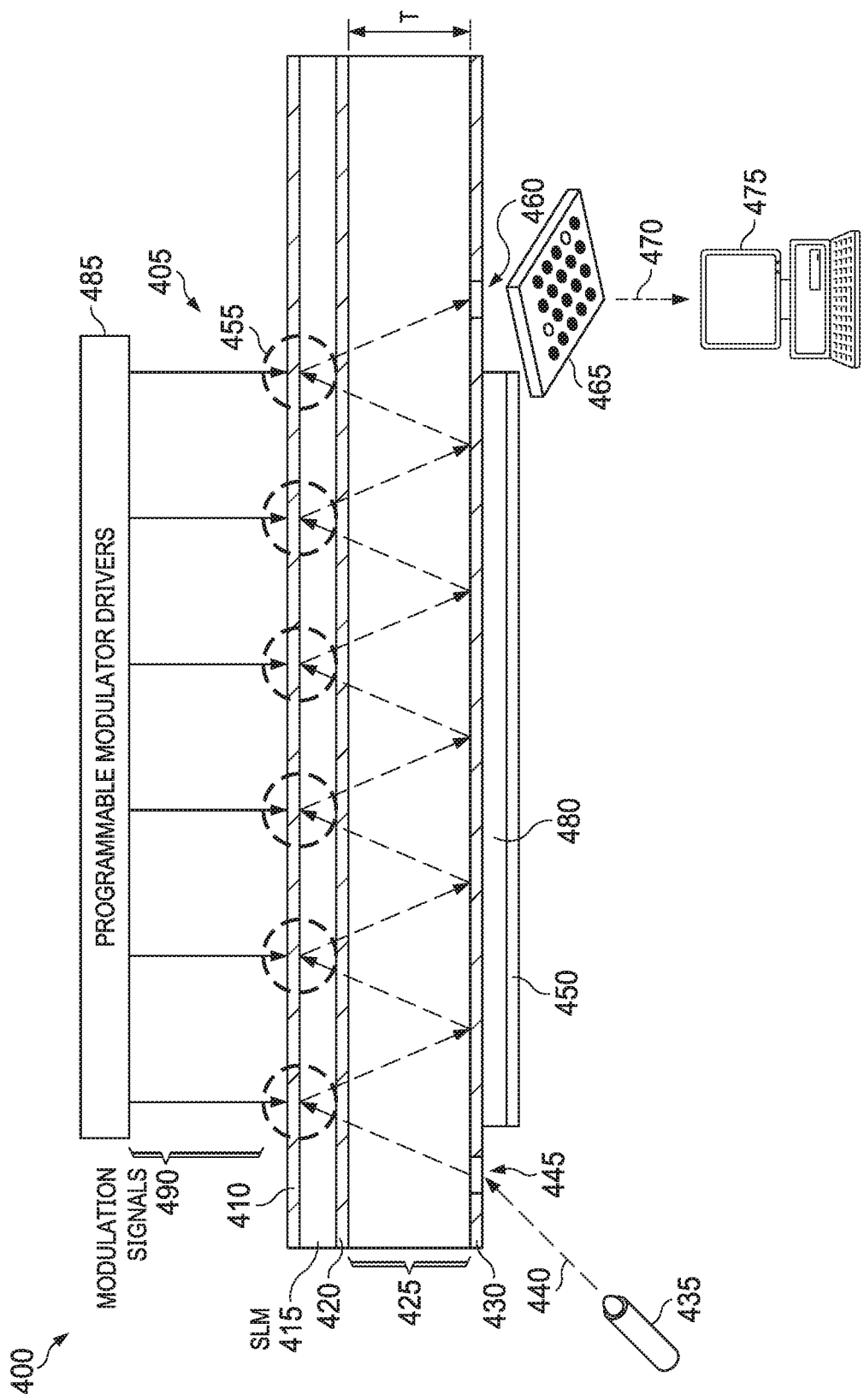
FIG. 4 is a schematic diagram of a $D^2NN$ system according to yet another embodiment of the disclosure.

FIG. 4 is a schematic diagram of a $D^2NN$ system 400 according to yet another embodiment of the disclosure. The $D^2NN$ system 400 is similar to the $D^2NN$ system 200 in FIG.

2. Specifically, the D²NN system 400 comprises a D²NN 405, a light source 435 configured to emit a light beam 440, a PD array 465 configured to output an electrical signal 470, and a computer 475 similar to the D²NN 205, the light source 235, the light beam 240, the PD array 265, the electrical signal 270, and the computer 275, respectively, in the D²NN system 200. In addition, the D²NN 405 comprises a mirror 410, a modulation layer 415, an AR layer 420, a diffraction layer 425, an AR layer 430, an input port 445, a mirror 450, and an output port 460 similar to the mirror 210, the modulation layer 215, the AR layer 220, the diffraction layer 225, the AR layer 230, the input port 245, the mirror 250, and the output port 260, respectively, in the D²NN 205. Finally, the modulation layer 415 comprises six modulation regions 455 similar to the modulation regions 255 in the modulation layer 215.

However, unlike the D²NN system 200, the D²NN system 400 further comprises programmable modulator drivers 485. The programmable modulator drivers 485 drive the modulation regions 455. In addition, instead of the modulation layer 215, which is not specified, the D²NN system 400 comprises an SLM 415. The SLM is an electrically-addressed SLM and may be based on liquid crystals. The programmable modulator drivers 485 transmit modulation signals 490 to the modulation layer 415 to cause the modulation regions 455 to perform desired spatial modulations. The spatial modulations may be dynamic because the programmable modulator drivers 485 may change the spatial modulations after manufacture of the D²NN 405. The modulator drivers 485 may be coupled to and controlled by the computer 475 or other device.

The D²NN 405 has the advantages described above for the D²NN 205. In addition, it is relatively easy to programmably or reconfigurably modulate the light beam 440. Specifically, the programmable modulator drivers 485 are outside the D²NN 405. Thus, the programmable modulator drivers 485 do not hinder propagation of the light beam 440 inside the D²NN 405. In addition, only one single 2D modulation layer needs to be fabricated to achieve the needed multiple modulation processes.

Figure 5A:
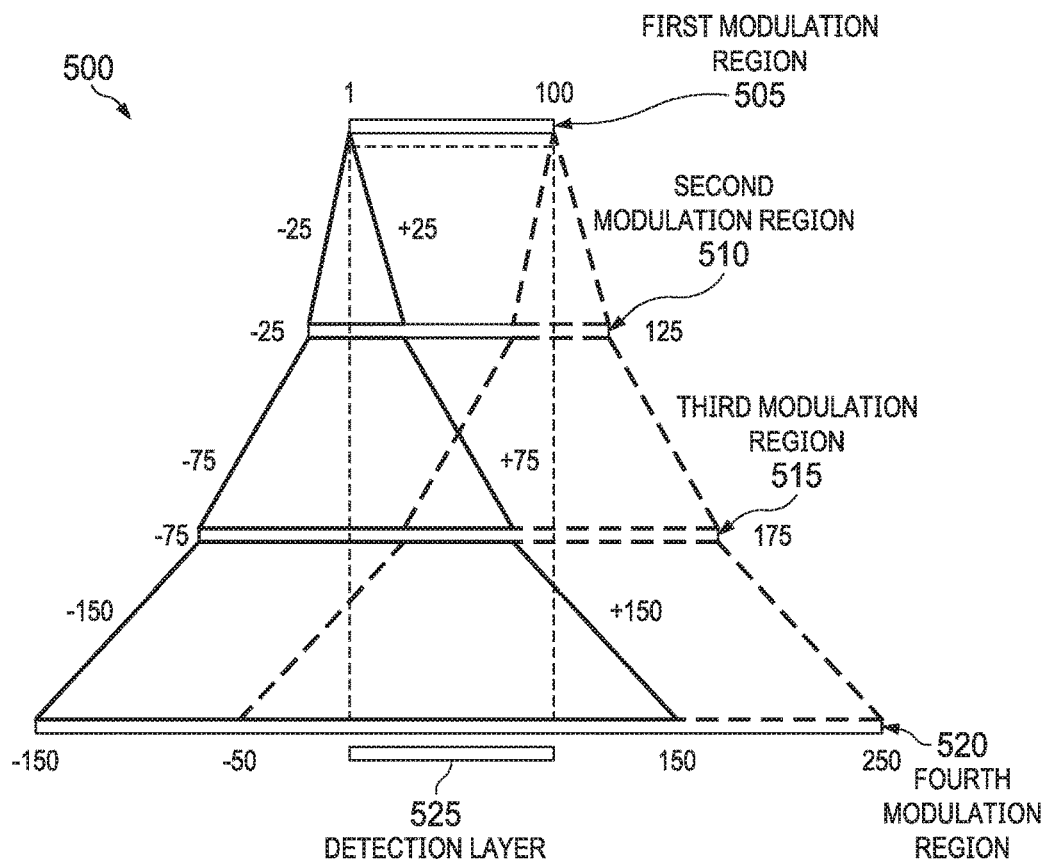
FIG. 5A is a light propagation diagram according to an embodiment of the disclosure.

FIG. 5A is a light propagation diagram 500 according to an embodiment of the disclosure. The D²NNs 205, 305, 405 may implement light propagation similar to the light propagation diagram 500. The light propagation diagram 500 comprises a first modulation region 505, a second modulation region 510, a third modulation region 515, and a fourth modulation region 520, which are similar to the modulation regions 255, 355, 455. In addition, the light propagation diagram 500 comprises a detection layer 525. The detection layer 525 has a width corresponding to the width of the output ports 260, 360, 460.

The light propagation diagram 500 demonstrates how light beams might propagate in the D²NNs 205, 305, 405. However, for purposes of illustration, instead of showing reflection of the light beams 240, 340, 440 in an opposite direction as would actually occur in the D²NNs 205, 305, 405, the light propagation diagram 500 shows transmission of a light beam in a continuous direction. Further, the light propagation diagram 500 shows light "spread" as the light beam 240, 340, or 440 is transmitted/reflected. The light beam 240, 340, or 440 grows wider due to refraction.

At an input of the first modulation region 505, the light beam extends from a 1st pixel to a 100th pixel for a total width of 100 pixels. The light beam reflects off of the first modulation region 505 and expands by ±25 pixels on each side, so the total width of the light beam becomes 150 pixels at an input of the second modulation region 510. The light beam reflects off of the second modulation region 510 and expands by ±50 pixels, so the total width of the light beam becomes 250 pixels at an input of the third modulation region 515. The light beam reflects off of the third modulation region 515 and expands by ±75 pixels, so the total width of the light beam becomes 400 pixels at an input of the detection layer 525. Finally, the light beam reflects off of the fourth modulation region 520 and enters the detection layer 525. Similar reflection and diffraction would occur for the six modulation regions 255, 355, 455 in the D²NNs 205, 305, 405.

The detection layer 525 has a range of 100 pixels. The light beam has a range of 400 pixels at the detection layer 525. Thus, the detection layer 525 occupies only 25% (100/400) of a final size of the light beam, which is not efficient.

Figure 5B:
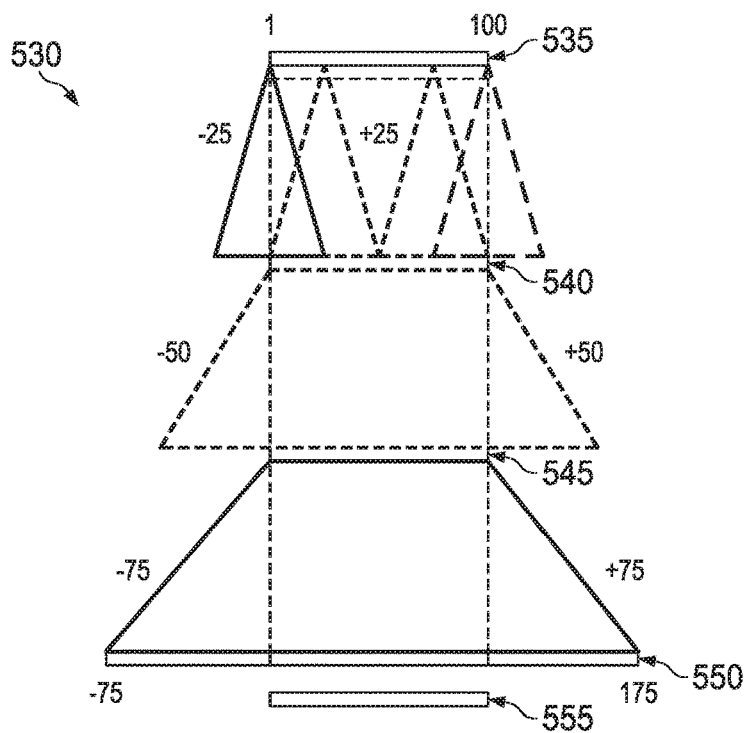
FIG. 5B is a light propagation diagram according to another embodiment of the disclosure.

FIG. 5B is a light propagation diagram 530 according to another embodiment of the disclosure. The D²NNs 205, 305, 405 may implement the light propagation diagram 530. The light propagation diagram 530 is similar to the light propagation diagram 500 in FIG. 5A. Specifically, the light propagation diagram 530 comprises a first modulation region 535, a second modulation region 540, a third modulation region 545, a fourth modulation region 550, and a detection layer 555 similar to the first modulation region 505, the second modulation region 510, the third modulation region 515, the fourth modulation region 520, and the detection layer 525, respectively, in the light propagation diagram 500.

However, unlike the second modulation region 510, the third modulation region 515, and the fourth modulation region 520, which get progressively wider, the first modulation region 535, the second modulation region 540, the third modulation region 545, and the fourth modulation region 550 all have a width of 100 pixels. The detection layer 555 has a range of 100 pixels. The light beam has a range of 250 pixels at the detection layer 555. Thus, the detection layer 555 occupies 40% (100/250) of a final size of the light beam, which is more efficient than in the light propagation diagram 500.

Figure 11:
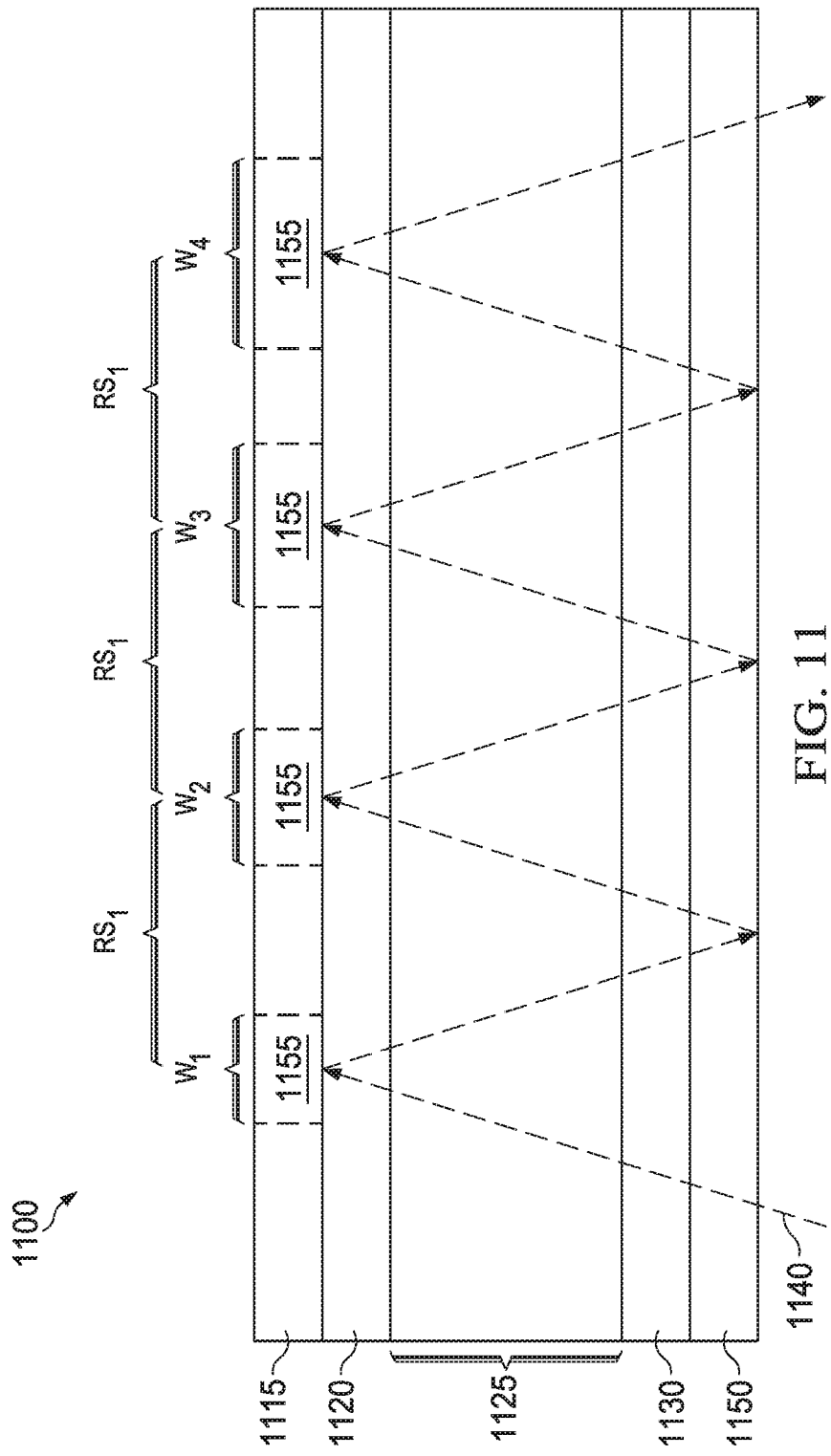
FIG. 11 is a schematic diagram of a portion of a D²NN system according to an embodiment of the disclosure.

FIG. 11 is a schematic diagram of a portion 1100 of a D²NN system according to an embodiment of the disclosure. The portion 1100 comprises a modulation layer 1115, an AR layer 1120, a diffraction layer 1125, an AR layer 1130, a light beam 1140, and a mirror 1150. The modulation layer 1115 comprises four modulation regions 1155 of widths $W_1$, $W_2$, $W_3$, and $W_4$. The modulation regions 1155 have an equal reflection spacing $RS_1$. In a manner similar to the light propagation diagram 500 in FIG. 5A, the modulation regions 1155 get progressively wider along a path of the light beam 1140 so that $W_2$ is wider than $W_1$, $W_3$ is wider than $W_2$, and $W_4$ is wider than $W_3$. Also in a manner similar to the light propagation diagram 500 in FIG. 5A, though not shown, the light beam 1140 expands after reflection at each of the modulation regions 1155.

Figure 12:
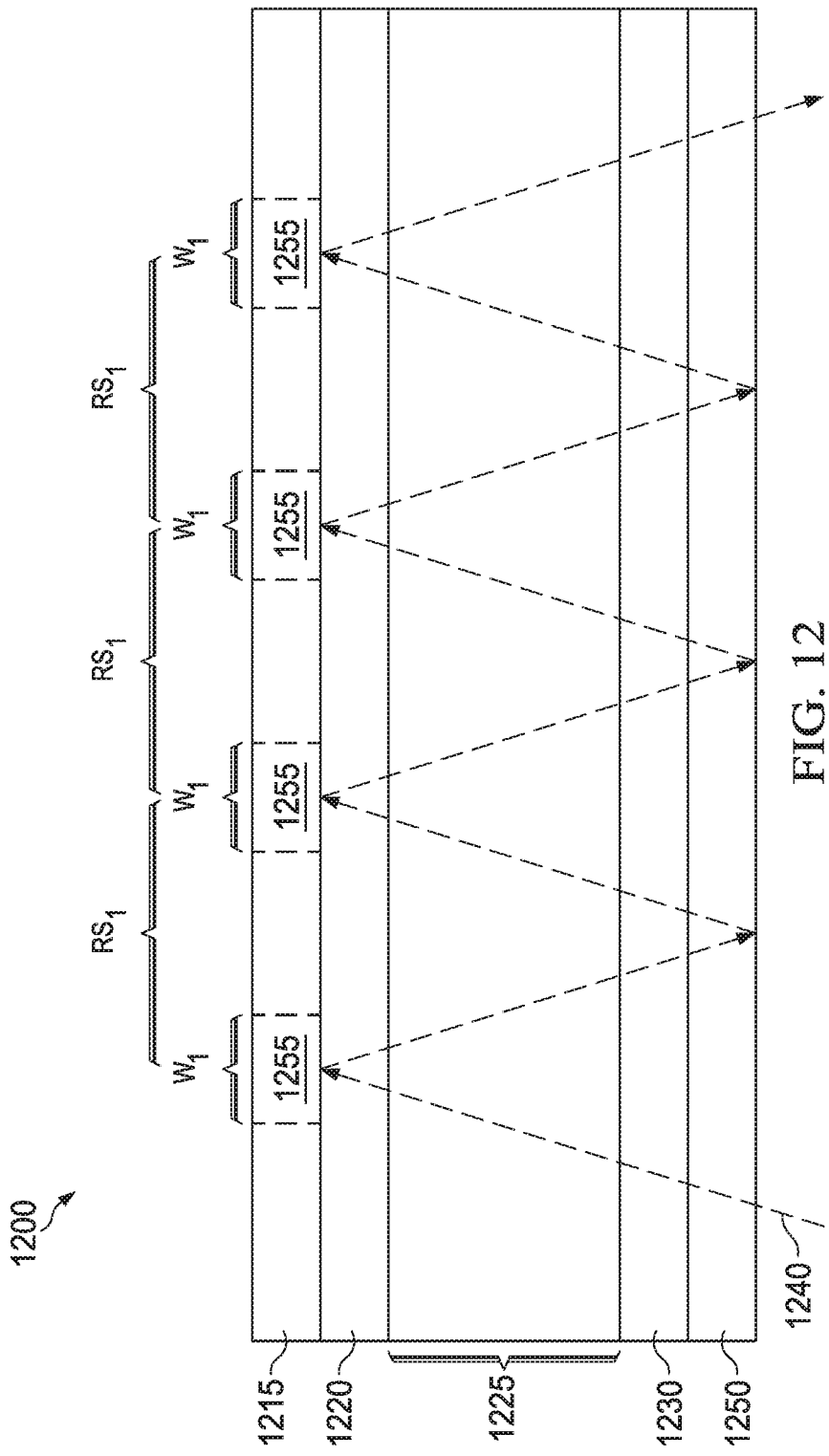
FIG. 12 is a schematic diagram of a portion of a D²NN system according to another embodiment of the disclosure.

FIG. 12 is a schematic diagram of a portion 1200 of a D²NN system according to another embodiment of the disclosure. The portion 1200 is similar to the portion 1100 in FIG. 11. Specifically, the portion 1200 comprises a modulation layer 1215, an AR layer 1220, a diffraction layer 1225, an AR layer 1230, a light beam 1240, and a mirror 1250 similar to the modulation layer 1115, the AR layer 1120, the diffraction layer 1125, the AR layer 1130, the light beam 1140, and the mirror 1150, respectively, in the portion 1100. In addition, the modulation layer 1215 comprises four modulation regions 1255 similar to the modulation regions 1155. Furthermore, the modulation regions 1255 have an equal reflection spacing $RS_1$. However, unlike the modulation regions 1155 in the portion 1100, but in a manner similar to the light propagation diagram 530 in FIG. 5B, the modulation regions 1255 in the portion 1200 all have a width $W_1$.

Figure 6:
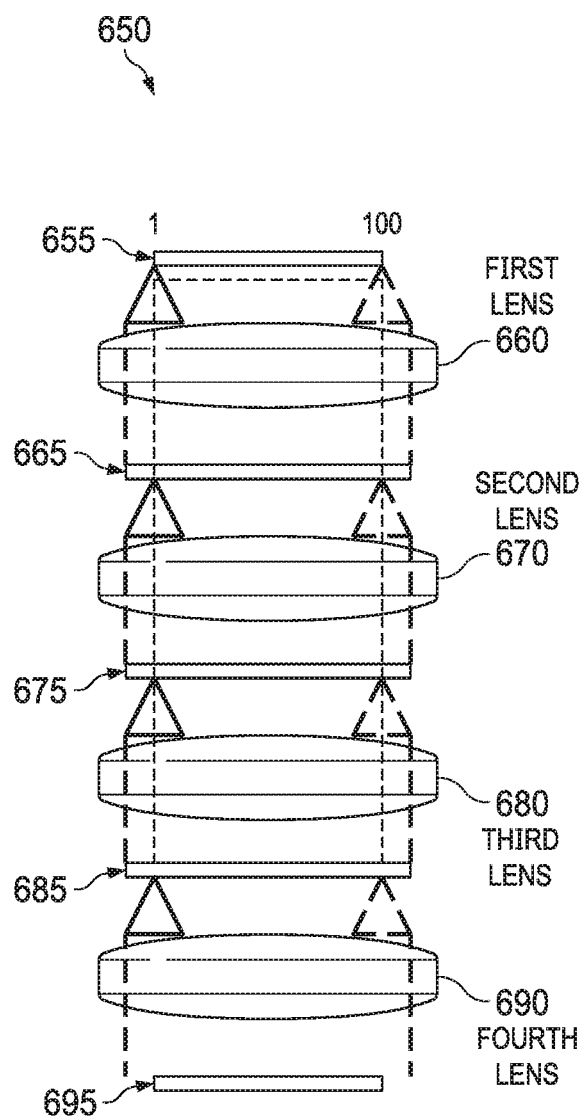
FIG. 6 is a light propagation diagram according to yet another embodiment of the disclosure.

FIG. 6 is a light propagation diagram 650 according to yet another embodiment of the disclosure. The $D^2NNs$ 205, 305, 405 may implement light propagation similar to the light propagation diagram 650. The light propagation diagram 650 is similar to the light propagation diagram 530 in FIG. 5B. Specifically, the light propagation diagram 650 comprises a first modulation region 655, a second modulation region 665, a third modulation region 675, a fourth modulation region 685, and a detection layer 695 similar to the first modulation region 535, the second modulation region 540, the third modulation region 545, the fourth modulation region 550, and the detection layer 555, respectively, in the light propagation diagram 530.

However, unlike the light propagation diagram 530, the light propagation diagram 650 further comprises a first lens 660, a second lens 670, a third lens 680, and a fourth lens 690. The first lens 660 is positioned between the first modulation region 655 and the second modulation region 665, the second lens 670 is positioned between the second modulation region 665 and the third modulation region 675, the third lens 680 is positioned between the third modulation region 675 and the fourth modulation region 685, and the fourth lens 690 is positioned between the fourth modulation region 685 and the detection layer 695.

The first lens 660, the second lens 670, the third lens 680, and the fourth lens 690 focus a light beam so that it diffracts substantially no pixels in each direction, so there is lower optical loss due to diffraction and better space utilization. Thus, the detection layer 695 has a useful range of about 100% of a final size of the light beam. In addition, the light propagation diagram 650 demonstrates that it could be relatively easy to implement a 4F-based system. A 4F system is an optical system in which three image-processing planes are separated by two identical lenses with an equal spacing F, where F is a focal length of the two identical lenses. Specifically, the light propagation diagram 650 demonstrates an 8F system by stacking two 4F systems.

Figure 13:
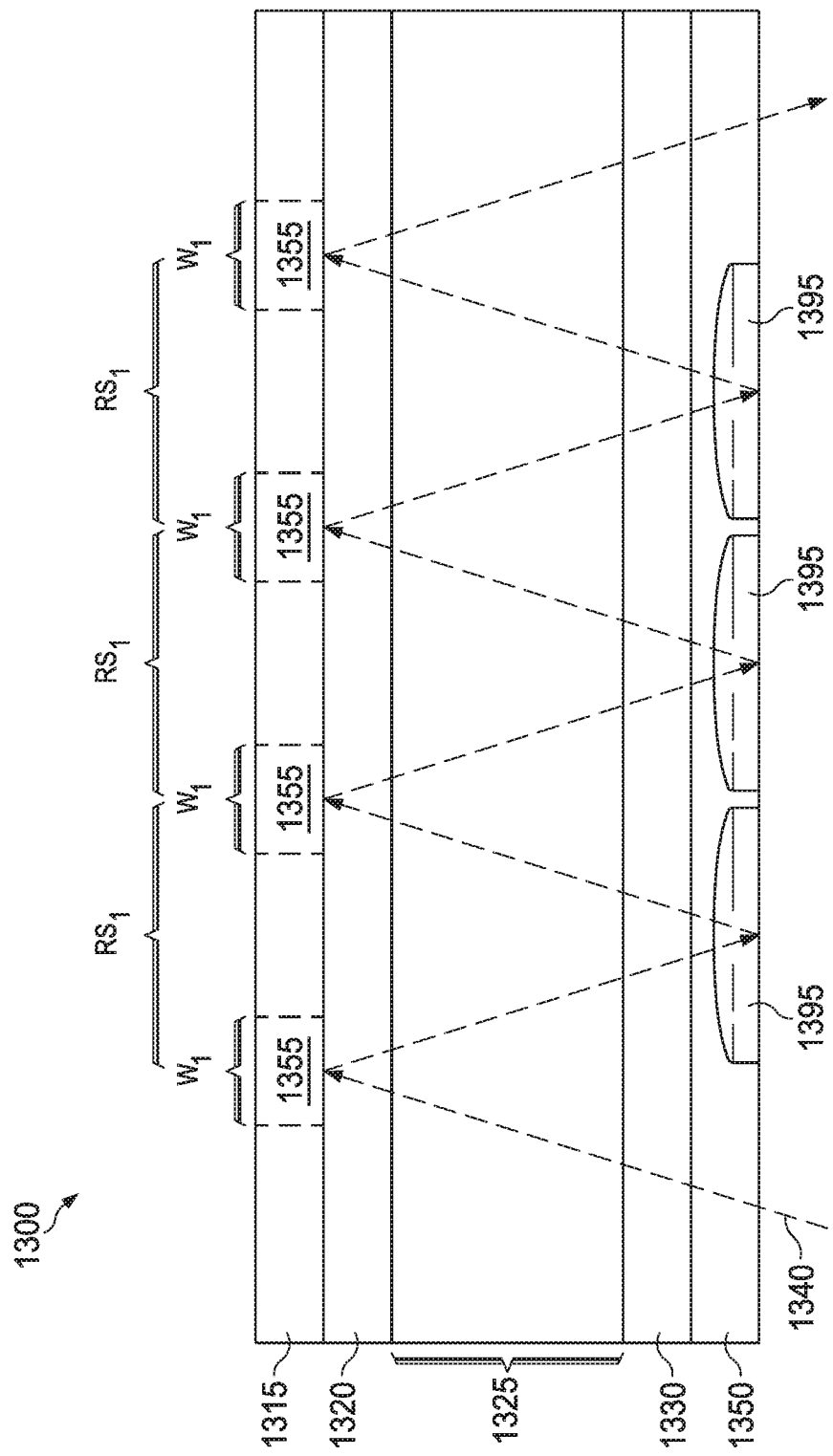
FIG. 13 is a schematic diagram of a portion of a D²NN system according to yet another embodiment of the disclosure.

FIG. 13 is a schematic diagram of a portion 1300 of a $D^2NN$ system according to another embodiment of the disclosure. The portion 1300 is similar to the portion 1200 in FIG. 12. Specifically, the portion 1300 comprises a modulation layer 1315, an AR layer 1320, a diffraction layer 1325, an AR layer 1330, a light beam 1340, and a mirror 1350 similar to the modulation layer 1215, the AR layer 1220, the diffraction layer 1225, the AR layer 1230, the light beam 1240, and the mirror 1250, respectively, in the portion 1200. In addition, the modulation layer 1315 comprises four modulation regions 1355 similar to the modulation regions 1255. Furthermore, the modulation regions 1355 have an equal reflection spacing $RS_1$ and all have a width $W_1$.

However, unlike the portion 1200, the portion 1300 comprises four lenses 1395. In a manner similar to the first lens 660, the second lens 670, the third lens 680, and the fourth lens 690 in the light propagation diagram 650 in FIG. 6, the lenses 1395 are positioned between the modulation regions 1355 in a lateral direction. The lenses 1395 may be made with a lithographic process in a dedicated layer. That dedicated layer replaces the AR layer 1330 or is in addition to the AR layer 1330. The lenses 1395 may be Fresnel lenses. The lenses 1395 focus the light beam 1340 so that the light beam 1340 diffracts relatively less in each direction. The reduced diffraction provides lower optical loss. Also in a manner similar to the light propagation diagram 650, the portion 1300 demonstrates that it could be relatively easy to implement a 4F-based system.

Figure 7:
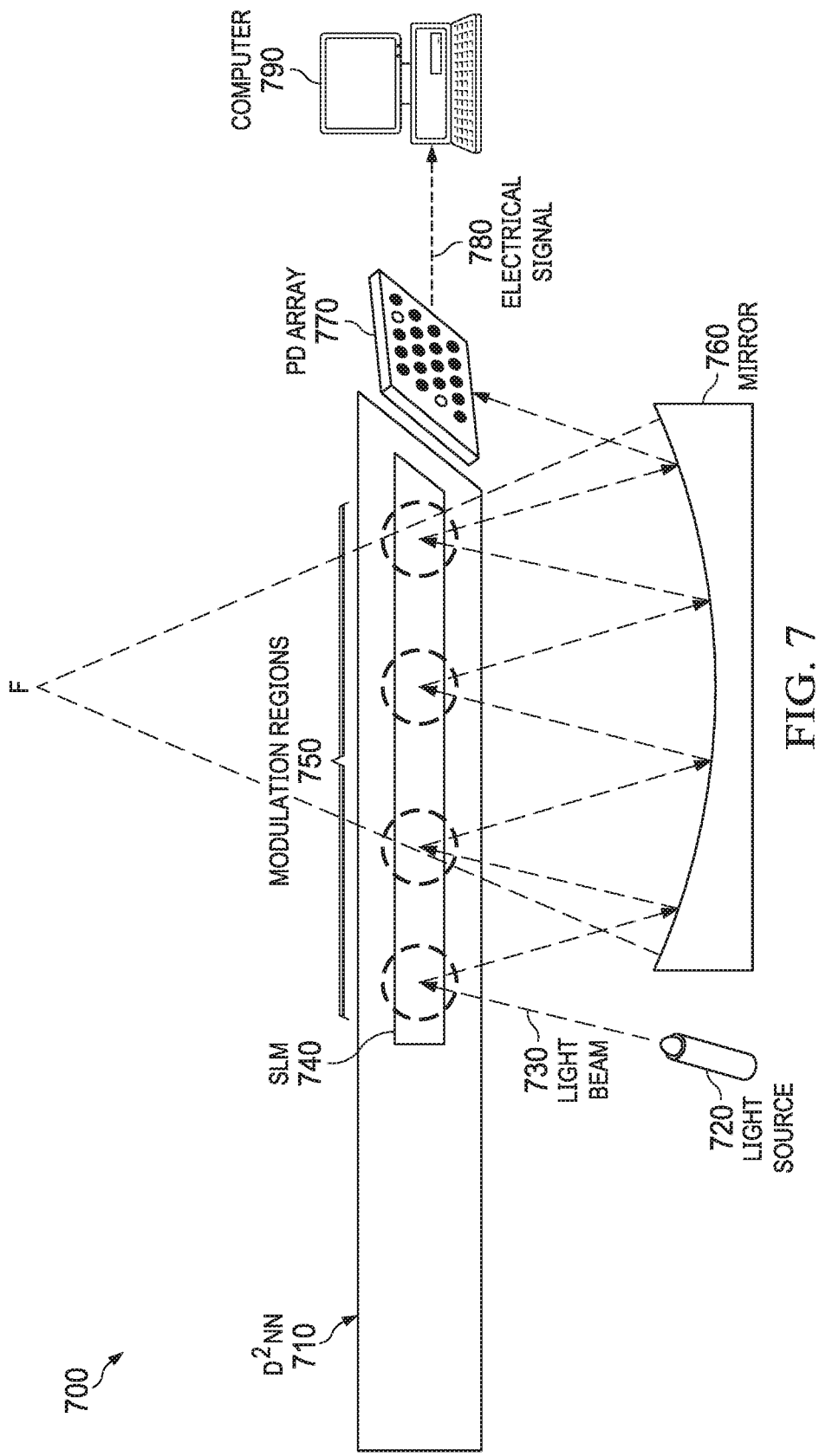
FIG. 7 is a schematic diagram of a $D^2NN$ system according to yet another embodiment of the disclosure.

FIG. 7 is a schematic diagram of a $D^2NN$ system 700 according to yet another embodiment of the disclosure. The $D^2NN$ system 700 comprises a $D^2NN$ 710, a light source 720 configured to emit a light beam 730, a mirror 760, a PD array 770 configured to output an electrical signal 780, and a computer 790. The $D^2NN$ 710 is similar to the $D^2NN$ 205, 305, 405. The $D^2NN$ 710 comprises an SLM 740. The SLM 740 is a spatially-multiplexed SLM. The SLM 740 comprises four modulation regions 750. The mirror 760 is a concave mirror. The mirror 760 is substantially parallel to layers in the $D^2NN$ 710. The mirror 760 has a focal length F that is equal to about an effective light beam path length between the mirror 760 and an opposing mirror in the $D^2NN$ 710. The mirror 760 focuses the light beam 730 back towards a mirror in the $D^2NN$ 710. The components of the $D^2NN$ system 700 may be arranged as shown or in another suitable manner. For instance, though four modulation regions 750 are shown, the SLM 740 may have any suitable number of modulation regions.

The $D^2NN$ system 700 operates in a manner similar to the $D^2NN$ system 400 in FIG. 4. However, unlike the light beam 440 in the $D^2NN$ system 400, which propagates through various media to reflect off of the mirror 450, the light beam 730 in the $D^2NN$ system 700 propagates via FSO to reflect off of the mirror 760. The mirror 760 provides lower optical loss due to diffraction, better space utilization, and easy implementation of a 4F system.

Figure 8:
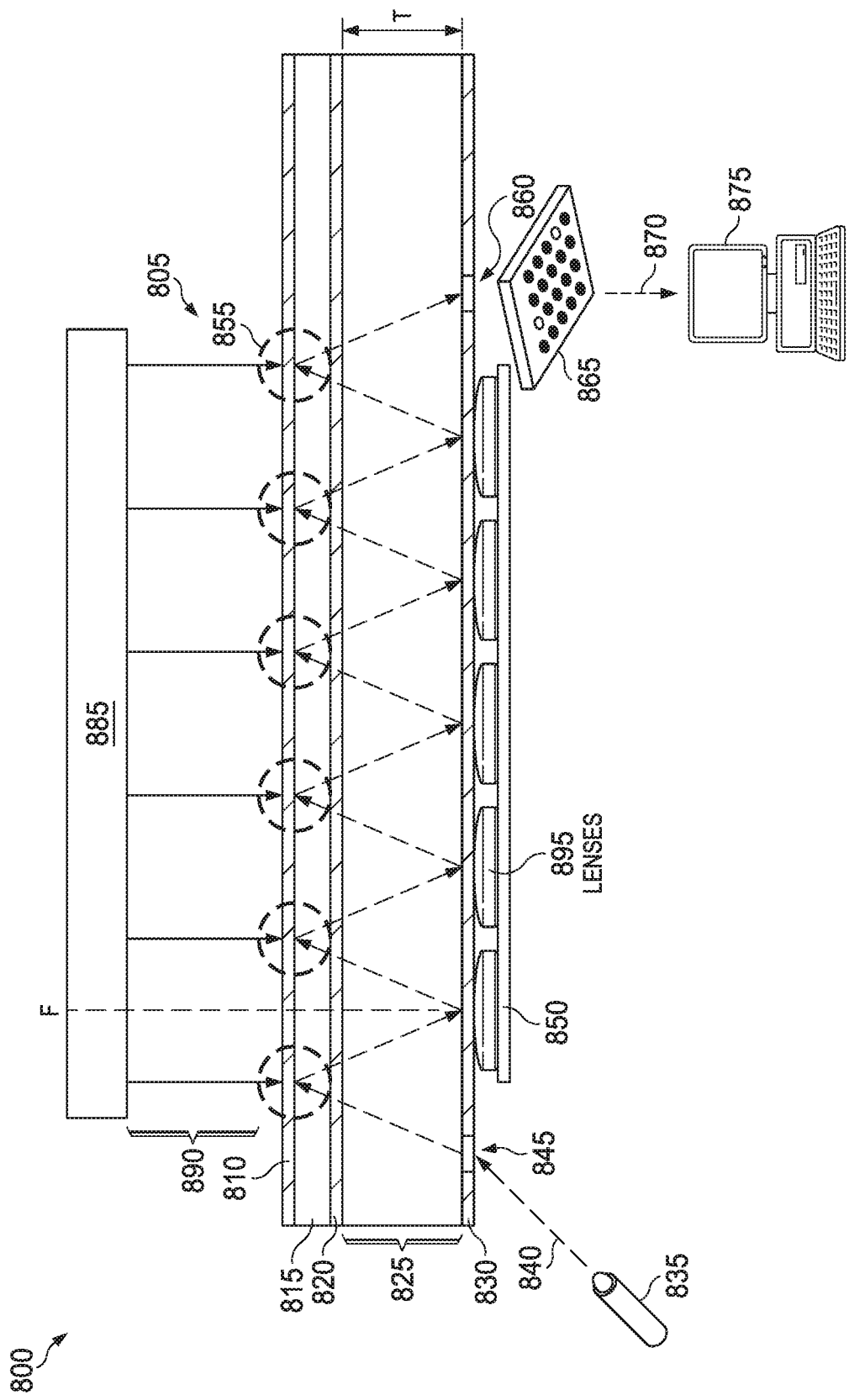
FIG. 8 is a schematic diagram of a $D^2NN$ system according to yet another embodiment of the disclosure.

FIG. 8 is a schematic diagram of a $D^2NN$ system 800 according to yet another embodiment of the disclosure. The $D^2NN$ system 800 is similar to the $D^2NN$ system 400 in FIG. 4. Specifically, the $D^2NN$ system 800 comprises a $D^2NN$ 805, a light source 835 configured to emit a light beam 840, a PD array 865 configured to output an electrical signal 870, a computer 875, a programmable modulator 885, and modulation signals 890 similar to the $D^2NN$ 405, the light source 435, the light beam 440, the PD array 465, the electrical signal 470, the computer 475, the programmable modulator drivers 485, and the modulation signals 490, respectively, in the $D^2NN$ system 400. In addition, the $D^2NN$ 805 comprises a mirror 810, a modulation layer 815, an AR layer 820, a diffraction layer 825, an AR layer 830, an input port 845, a mirror 850, and an output port 860. Finally, the modulation layer 815 comprises six modulation regions 855.

However, unlike the $D^2NN$ system 400, the $D^2NN$ 805 further comprises four lenses 895. As shown, the lenses 895 are centered between the modulation regions 855 with respect to a horizontal direction so that the lenses 895 receive reflected/refracted light from a preceding modulation region. The lenses 895 will focus the light beam 840 after each modulation region 855 spatially modulates the light beam 840. The lenses 895 may be Fresnel lenses in some embodiments. The lenses 895 have a focal length F that is equal to about twice an effective light beam path length between the mirror 850 and the mirror 810. During manufacture of the $D^2NN$ 805, the lenses 895 may be made with a lithographic process in a dedicated layer of the $D^2NN$ 805. That dedicated layer replaces the AR layer 830 or is in addition to the AR layer 830. The lenses 895 provide lower optical loss in the presence of diffraction, and offer better space utilization and easy implementation of a 4F system.

Figure 9:
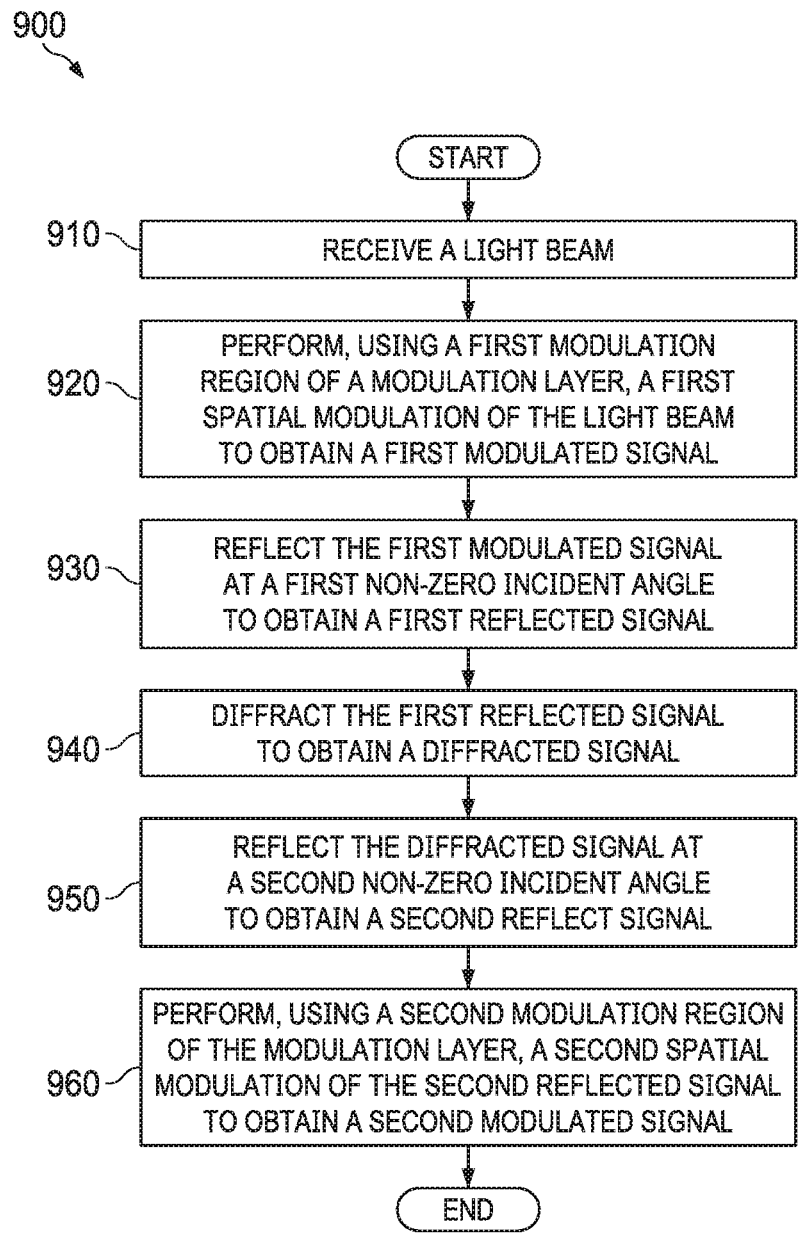
FIG. 9 is a flowchart illustrating a method of $D^2NN$ processing according to an embodiment of the disclosure.

FIG. 9 is a flowchart illustrating a method 900 of $D^2NN$ processing according to an embodiment of the disclosure. The $D^2NNs$ 205, 305, 405, 705, 805 may implement the method 900. At step 910, a light beam is received. For instance, the input port 245 receives the light beam 240.

At step 920, using a first modulation region of a modulation layer, a first spatial modulation of the light beam is performed to obtain a first modulated signal. For instance, a first modulation region 255 performs the first spatial modulation. At step 930, the first modulated signal is reflected at a first non-zero incident angle to obtain a first reflected signal. For instance, the mirror 210 reflects the first modulated signal.

At step 940, the first reflected signal is diffracted to obtain a diffracted signal. For instance, the diffraction layer 225 diffracts the first reflected signal when the first reflected signal enters the diffraction layer 225. At step 950, the diffracted signal is reflected at a second non-zero incident angle when the signal exits the diffraction layer 225 to obtain a second reflected signal. For instance, the mirror 250 reflects the exiting diffracted signal. Finally, at step 960, using a second modulation region of the modulation layer, a second spatial modulation of the second reflected signal is performed to obtain a second modulated signal. For instance, the second modulation region 255 performs the second spatial modulation.

The method 900 may implement additional embodiments. In a first additional embodiment, before reflecting the diffracted signal, the diffracted signal is focused. For instance, one of the lenses 895 may focus the diffracted signal. In a second additional embodiment, at least one additional spatial modulation is performed to obtain a final modulated signal, and the final modulated signal is passed towards a PD array. For instance, the modulation regions 255 perform at least one additional spatial modulation as the light travels from the input port to the output port. Consequently, the modulation is not limited to two occurrences/regions. The output port 260 passes the final modulated signal to the PD array 265. In a third additional embodiment, the first non-zero incident angle and the second non-zero incident angle are different. For instance, the first non-zero incident angle is about 24°, and the second non-zero incident angle is another angle. In a fourth additional embodiment, the first non-zero incident angle and the second non-zero incident angle are the same. For instance, the first non-zero incident angle and the second non-zero incident angle are about 24°.

Figure 10:
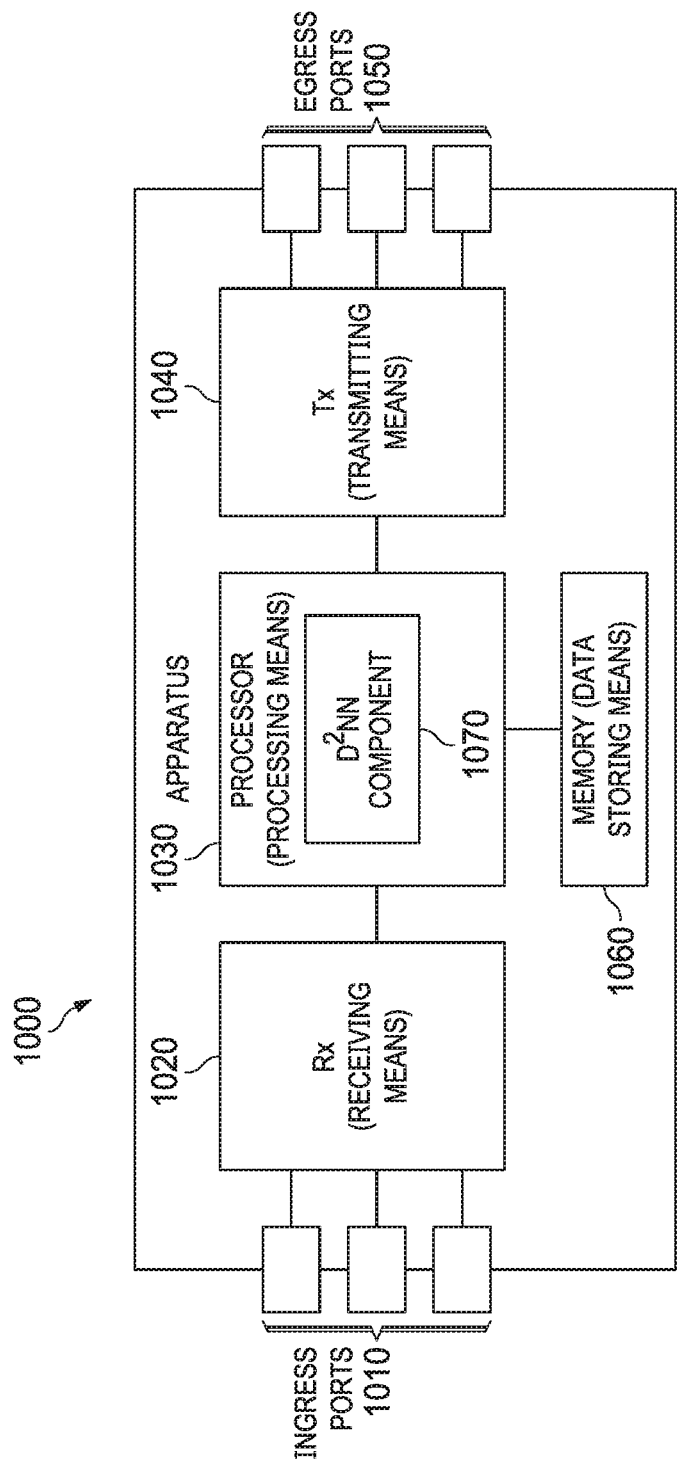
FIG. 10 is a schematic diagram of an apparatus according to an embodiment of the disclosure.

FIG. 10 is a schematic diagram of an apparatus 1000 according to an embodiment of the disclosure. The apparatus 1000 may implement the disclosed embodiments. For instance, the apparatus 1000 may implement the computers 275, 375, 475, 790, 875. The apparatus 1000 comprises ingress ports 1010 and an RX 1020 or receiving means to receive data; a processor 1030 or logic unit, baseband unit, CPU, or processing means to process the data; a TX 1040 or transmitting means and egress ports 1050 to transmit the data; and a memory 1060 or data storing means to store the data. The apparatus 1000 may also comprise OE components, EO components, or RF components coupled to the ingress ports 1010, the RX 1020, the TX 1040, and the egress ports 1050 to provide ingress or egress of optical signals, electrical signals, or RF signals.

The processor 1030 is any combination of hardware, middleware, firmware, or software. The processor 1030 comprises any combination of one or more CPU chips, cores, FPGAs, ASICs, or DSPs. The processor 1030 communicates with the ingress ports 1010, the RX 1020, the TX 1040, the egress ports 1050, and the memory 1060. The processor 1030 comprises a D$^2$NN component 1070, which implements the disclosed embodiments. The inclusion of the D$^2$NN component 1070 therefore provides a substantial improvement to the functionality of the apparatus 1000 and effects a transformation of the apparatus 1000 to a different state. Alternatively, the memory 1060 stores the D$^2$NN component 1070 as instructions, and the processor 1030 executes those instructions.

The memory 1060 comprises any combination of disks, tape drives, or solid-state drives. The apparatus 1000 may use the memory 1060 as an over-flow data storage device to store programs when the apparatus 1000 selects those programs for execution and to store instructions and data that the apparatus 1000 reads during execution of those programs, for instance as a computer program product. The memory 1060 may be volatile or non-volatile and may be any combination of ROM, RAM, TCAM, or SRAM.

A computer program product may comprise computer-executable instructions stored on a non-transitory medium, for instance the memory 1060, that when executed by a processor, for instance the processor 1030, cause an apparatus to perform any of the embodiments.

The term "about" means a range including ±10% of the subsequent number unless otherwise stated. The term "substantially" means within ±10%. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
    a first mirror;
    a second mirror;
    a modulation layer positioned between the first mirror and the second mirror and comprising a plurality of modulation regions;
    a diffraction layer positioned between the modulation layer and the second mirror; and
    an input port for admitting a light beam into the apparatus, the light beam passing through the diffraction layer and being modulated by the modulation layer to create a first modulated beam before being reflected by the first mirror, the first mirror reflecting the first modulated beam toward the second mirror, and the second mirror reflecting the first modulated beam toward the modulation layer to be modulated for at least a second time.

2. A diffractive deep neural network (D$^2$NN) device comprising:
    an input port configured to receive a light beam;
    a modulation layer comprising a first modulation region and a second modulation region, the first modulation region configured to perform a first spatial modulation on the light beam to obtain a first modulation signal;

a first mirror configured to reflect the first modulated signal at a first non-zero incident angle to obtain a first reflected signal;

a diffraction layer configured to diffract the first reflected signal to obtain a diffracted signal; and a second mirror configured to reflect the diffracted signal at a second non-zero incident angle to obtain a second reflected signal, the second modulation region configured to perform a second spatial modulation on the second reflected signal to obtain a second modulated signal.

3. The $D^2NN$ device of claim 2, further comprising a lens configured to focus the diffracted signal before the second mirror reflects the diffracted signal, wherein the lens is a Fresnel lens that has a focal length F that is equal to about twice an effective light beam path length between the second mirror and the first mirror.

4. The $D^2NN$ device of claim 2, wherein the modulation layer comprises at least one additional modulation region configured to perform an additional spatial modulation to obtain a final modulated signal, and wherein the $D^2NN$ device further comprises an output port configured to pass the final modulated signal towards a photodetector (PD) array.

5. The $D^2NN$ device of claim 2, wherein the second mirror is concave.

6. The $D^2NN$ device of claim 2, wherein the second mirror is configured to focus the diffracted signal back towards the first mirror.

7. The $D^2NN$ device of claim 2, wherein the second mirror has a focal length F that is equal to about an effective light beam path length between the second mirror and the first mirror.

8. The $D^2NN$ device of claim 2, wherein the first spatial modulation and the second spatial modulation are any combination of a phase modulation or an amplitude modulation.

9. The $D^2NN$ device of claim 2, wherein the first spatial modulation and the second spatial modulation are static.

10. The $D^2NN$ device of claim 2, wherein the first spatial modulation and the second spatial modulation are dynamic and based on modulation signals from programmable modulator drivers.

11. The $D^2NN$ device of claim 2, further comprising a non-linearity layer configured to generate a non-linearity in the diffracted signal based on an electro-optical effect before the second mirror reflects the diffracted signal.

12. The $D^2NN$ device of claim 2, further comprising a non-linearity layer configured to generate a non-linearity in the diffracted signal based on an electro-absorption effect before the second mirror reflects the diffracted signal.

13. The $D^2NN$ device of claim 2, wherein the light beam comprises an optical image.

14. A method of diffractive deep neural network ($D^2NN$) processing, the method comprising:

receiving a light beam;

performing, using a first modulation region of a modulation layer, a first spatial modulation of the light beam to obtain a first modulated signal;

reflecting the first modulated signal at a first non-zero incident angle to obtain a first reflected signal;

diffracting the first reflected signal to obtain a diffracted signal;

reflecting the diffracted signal at a second non-zero incident angle to obtain a second reflected signal; and performing, using a second modulation region of the modulation layer, a second spatial modulation of the second reflected signal to obtain a second modulated signal.

15. The method of claim 14, further comprising focusing the diffracted signal before reflecting the diffracted signal.

16. The method of claim 14, further comprising:

performing at least one additional spatial modulation to obtain a final modulated signal; and passing the final modulated signal towards a photodetector (PD) array.

17. The method of claim 14, wherein the first spatial modulation and the second spatial modulation are dynamic.

18. The method of claim 14, further comprising generating, before reflecting the diffracted signal, a non-linearity in the diffracted signal based on an electro-optical effect.

19. The method of claim 14, further comprising generating, before reflecting the diffracted signal, a non-linearity in the diffracted signal based on an electro-absorption effect.

20. The method of claim 14, wherein the light beam comprises an optical image.

* * * * *